United States Patent [19]

Yokogawa et al.

[11] 4,070,784
[45] Jan. 31, 1978

[54] ELECTRIC FISHING FLOAT

[75] Inventors: Seiji Yokogawa, Moriguchi; Kiyoshi Takenaka, Hirakata, both of Japan

[73] Assignee: Matsushita Electric Industrial Co., Ltd., Japan

[21] Appl. No.: 704,816

[22] Filed: July 13, 1976

[30] Foreign Application Priority Data

July 15, 1975 Japan .............................. 50-98562[U]
July 15, 1975 Japan .............................. 50-98563[U]
Dec. 17, 1975 Japan ............................. 50-171752[U]
Dec. 17, 1975 Japan ............................. 50-171753[U]

[51] Int. Cl.$^2$ ............................................. A01K 85/01
[52] U.S. Cl. ..................................................... 43/17.5
[58] Field of Search ................. 43/17, 17.5, 17.1, 17.6

[56] References Cited

U.S. PATENT DOCUMENTS

| 2,128,899 | 9/1938 | Barnhart | 43/17 |
| 3,421,246 | 1/1969 | Jinushi et al. | 43/17.5 |

FOREIGN PATENT DOCUMENTS

| 835,140 | 5/1960 | United Kingdom | 43/17 |
| 1,082,095 | 9/1967 | United Kingdom | 43/17 |

Primary Examiner—Jay N. Eskovitz
Assistant Examiner—Robert P. Swiatek
Attorney, Agent, or Firm—Burgess, Ryan and Wayne

[57] ABSTRACT

An electric fishing float in which a cell used as a power source is an elongated cylindrical cell having an electrode axially upwardly extended from the top of the cell and with the shell of the cell serving as another or opposite electrode in order to turn on a light source such as a light emitting diode or miniature lamp positioned within an elongated float body adjacent the closed top end thereof.

6 Claims, 6 Drawing Figures

FIG. 1
FIG. 2
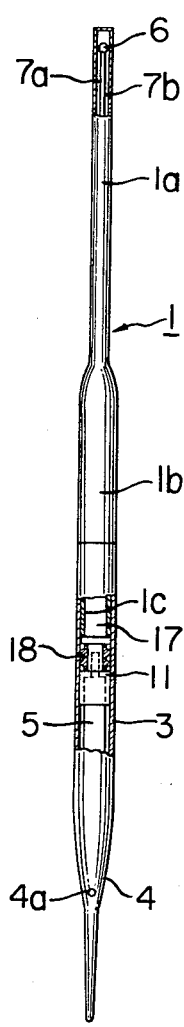
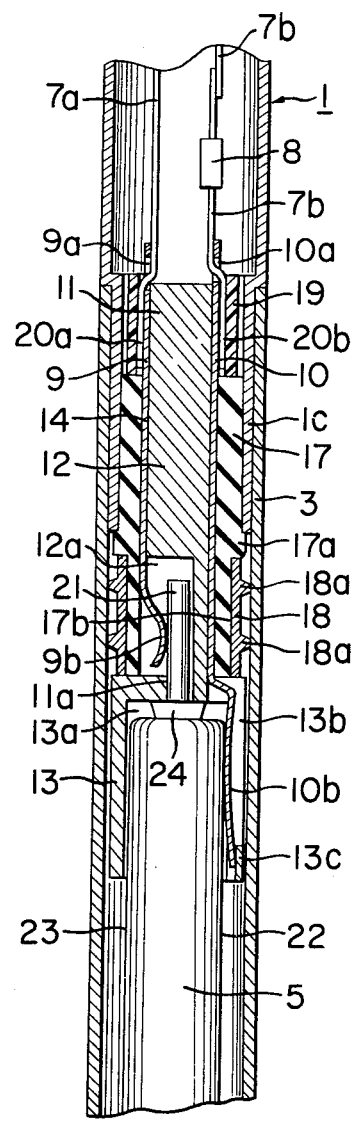

FIG. 3
FIG. 4
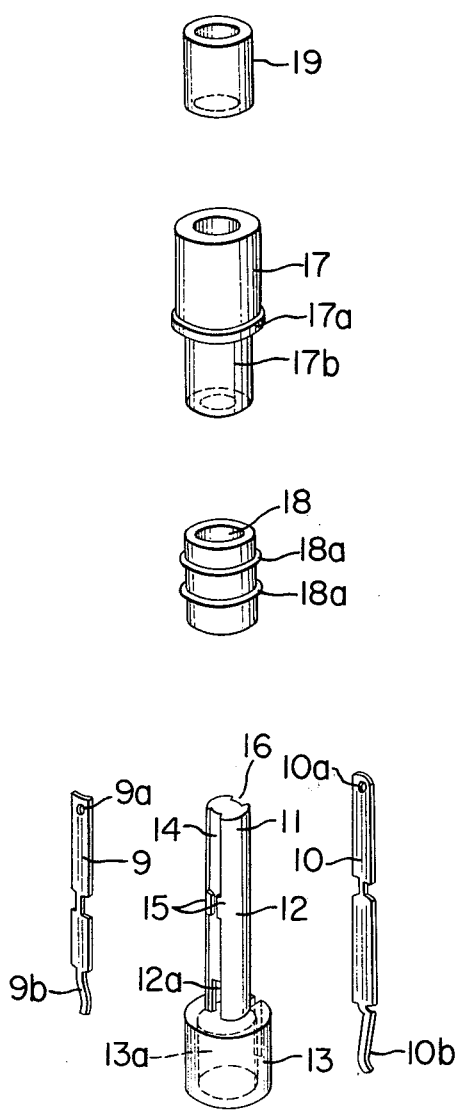
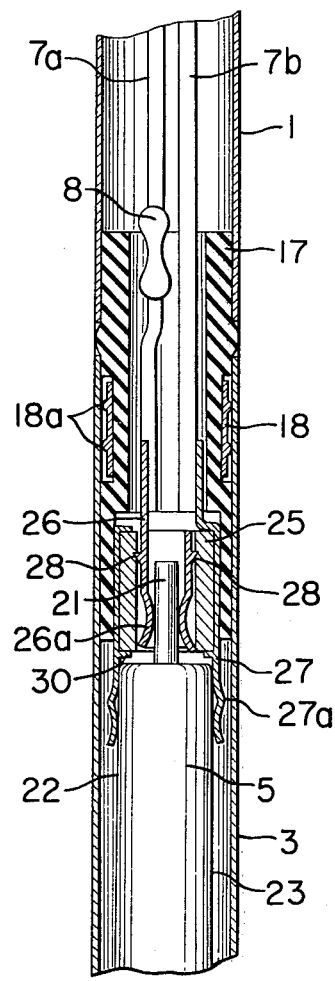

FIG. 5
FIG. 6
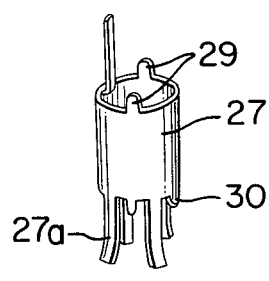
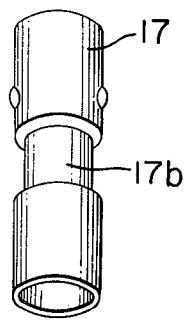
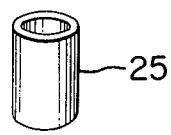
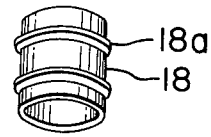
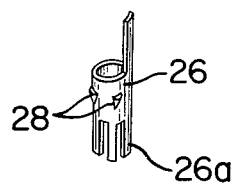
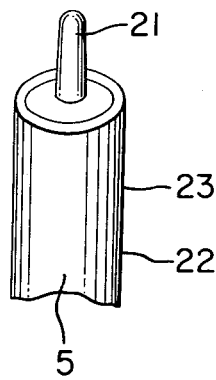

ELECTRIC FISHING FLOAT

BACKGROUND OF THE INVENTION

The present invention relates to an improvement over an electric fishing float of the type incorporating therein an elongated cylindrical cell for turning on a light source located within an elongated float body adjacent the closed upper end thereof.

In the electric fishing floats of the type described, it is most preferable to use as a light source a light emitting diode because it has strong resistance to impact and can eliminate the problem of disconnection of a filament of a lamp and accordingly has a semi-permanent service life. Light emitting diodes start emitting light when the voltage impressed exceeds about 1.7V so that a cell capable of supplying about 2V must be used. However each of the conventional mercury and manganese cells can supply the terminal voltage of only about 1.3 to 1.5V so that at least two cells must be provided. As a result, the electric fishing floats become large in size and heavy in weight, resulting in poor response to biting by a fish.

The conventional electric fishing floats have a further problem that electric connection between the cell and the light source is not stable and reliable. More particularly, it has been difficult to securely hold the cell within a fishing float and to retain in position the contact members for electrically interconnecting between the light source and the cell. Furthermore the replacement of a cell is not so easy.

Water-tight sealing is a still further problem encountered in the conventional electric fishing floats. In general, O-rings have been widely used to from a water-tight seal in the joint between the upper and lower case sections of an elongated fishing float body or case. The use of an O-ring presents no problem when the fishing floats are large in size, but a serious problem arises when the diameter of the fishing floats is small because the smaller the diameter of an O-ring, the less the compression tolerance becomes. Therefore, with the use of O-rings it is difficult to attain the water-tight sealing unless the fishing floats are fabricated with a higher degree of dimensional accuracy.

SUMMARY OF THE INVENTION

In view of the above, one of the objects of the present invention is to provide an electric fishing float having an extremely elongated body so that the sharp response to the biting by a fish may be attained.

Another object of the present invention is to provide an electric fishing float wherein electrical interconnection between a cell and a light source is highly stable, reliable and dependable in operation and the easy replacement of a cell may be effected.

A further object of the present invention is to provide an electric fishing float wherein the positive and secure water-tight sealing may be provided for the joint between the upper and lower case section of an elongated float body to completely prevent the contact of the parts enclosed within the fishing float body with sea water, thereby preventing the corrosion and consequent malfunction thereof.

Briefly stated, to the above and other ends the present invention provides an electric fishing float characterized by the provision of an elongated tubular fishing float case comprising an upper case section with a light source positioned therein adjacent to the closed top end thereof and a lower case section provided with a water-tight connection to said upper case section; a cell disposed within said lower case section and having an electrode axially upwardly extended from the top thereof, the shell of said cell serving as another or opposite electrode; a tubular insulating member having the upper portion thereof fitted into the lower portion of the hole of said upper section with a water-tight seal; a pair of contact members securely held in position between said tubular insulating member and a core member inserted into said tubular insulating member; electrical connection means disposed within said core member for making electrical connection between one of said pair of contact members and said axially upwardly extended electrode of said cell and between the other contact member and the shell or opposite electrode of said cell; and a pair of lead wires for electrically interconnecting between said light source and said pair of contact members.

BRIEF DESCRIPTION OF THE DRAWINGS:

FIG. 1 is a front view, partly cut out, of a first embodiment of the present invention;

FIG. 2 is a fragmentary sectional view, on enlarged scale, thereof;

FIG. 3 is an exploded perspective view of trim parts thereof;

FIG. 4 is a fragmentary sectional view of a second embodiment of the present invention;

FIG. 5 is an exploded perspective view of some essential parts thereof; and

FIG. 6 is a perspective view of a tubular insulating member and a tubular packing member.

Same reference numerals are used to designate similar parts throughout the figures.

DESCRIPTION OF THE PREFERRED EMBODIMENTS:

First Embodiment, FIGS. 1, 2 and 3

Referring to FIGS. 1, 2 and 3, a fishing float in accordance with the present invention has an elongated tubular case comprising an upper tubular case 1 and a lower tubular case 3. The upper tubular case 1 is made of a transparent synthetic resin and consists of a smaller diameter tubular section 1a with a closed top end, a large diameter tubular section 1b and a smaller diameter tubular male section 1c with an open bottom end. The lower tubular case 3 is made of an opaque synthetic resin and has the open top end and a downwardly tapered leg section 4 with an eye 4a for connection with a fishing line. When the male section 1c of the upper case 1 is inserted into the lower case 3, the outer side surfaces of the upper and lower cases 1 and 3 are coplanar with each other as best shown in FIG. 2. The lower case 3 houses a battery or cell 5 to be described in detail hereinafter, and a light source 6 such as a light emitting diode or miniature lamp (the former is used in the first embodiment) is placed in the small diameter tubular section 1a of the upper case 1 adjacent the closed top end thereof and is electrically connected through lead wires 7a and 7b and a resistor 8 connected to the lead wire 7b and to the terminals of the battery or cell 5.

The lower end portions of the lead wires 7a and 7b are inserted through holes 9a and 10a, respectively, of a pair of elongated contact members 9 and 10 arcuate in cross section as best shown in FIG. 3 and are brought into electrical contact with the outer surfaces of the contact members 9 and 10 as best shown in FIG. 2. Both the elongated contact members 9 and 10 are made of an electrically conductive material such as copper and have the lower end portions terminated into inwardly curved or bulged resilient legs 9b and 10b, respectively. It should be noted that the contact member 10 is longer than the contact member 9; that is, the leg 10b of the contact member 10 is extended downwardly beyond the leg 9b of the contact member 9 when assembled as best shown in FIG. 2.

A stepped cylindrical core member generally indicated by the reference numeral 11 is made of an electrically insulating material such as nitril rubber, fluoroplastics or the like and consists of a small diameter solid cylindrical section 12 and a large diameter hollow cylindrical section 13 with a cylindrical cavity 13a. The small diameter cylindrical section 12 is formed with a pair of diametrically opposed and axially extended grooves 14 and 16 for receiving therein the contact members 9 and 10, respectively. The lower end of the axial groove 14 is terminated into a axially partly elongated cutout portion or recess 12a which is communicated with the cylindrical cavity 13a of the large diameter section 13 through a center hole 11a as best shown in FIG. 2. The lower end of the axial groove 16 is communicated with the cylindrical cavity 13a of the large diameter section 13 through an axially partly extended slot 13b formed through the side wall of the large diameter cylindrical section 13.

As described above, the contact member 9 is inserted into the axial groove 14 of the small diameter section 12 and securely held in position by means of a pair of retaining projections 15 with the leg 9b inserted into the cutout portion or recess 12a. In like manner, the contact member 10 is inserted into the axial groove 16 and securely held in position by means of a pair of retaining projections (not shown) similar to the projections 15 with the leg 10b inserted into the axial slot 13b and partly extended into the cylindrical cavity 13a of the large diameter section 13. As best shown in FIG. 2, the lower end of the leg 10b of the contact member 10 is securely held in position by means of a retaining projection 13c extended axially upwardly from the lower end of the axial slot 13b.

A tubular insulation member 17 is made of an electrically insulating material such as synthetic resin and consists of a large diameter upper section with an annular flange 17a and a small diameter lower section 17b. The tubular insulation member 17 is fitted over the small diameter cylindrical section 12 of the core member 11 as best shown in FIG. 2 so that the contact members 9 and 10 inserted into the axial grooves 14 and 16 of the core member can be more securely held in position to be prevented from being pulled out of the axial grooves 14 and 16.

A water-tight, tubular packing member 18 is made of a resilient material such as rubber and has two axially spaced annular ridges or projections 18a. The packing member 18 is snugly fitted over the small diameter lower section 17b of the insulation member 17 with the annular ridges abutting against the inner wall surface of the lower case 3 as best shown in FIG. 2 and forming a water-tight seal.

A tubular pressure member 19 is made of an electrically insulating and resilient material such as rubber and fitted over the upper portion of the small diameter section 12 of the core member 11 as shown in FIG. 2 so that the lower portions 20a and 20b of the lead wires 7a and 7b are firmly pressed against the contact members 9 and 10 to ensure the satisfactory electrical connection therebetween and to prevent the lead wires 7a and 7b from being pulled out of the holes 9a and 10a of the contact members 9 and 10.

The battery or dry cell 5 has a pin-shaped electrode 21 upwardly axially extended and electrically insulated by an insulating member 24 from the top of a shell 22 which serves as another electrode of the cell 5. As best shown in FIG. 2, the cell 5 is partly inserted into the cylindrical cavity 13a of the large diameter section 13 of the core member 11 with the pin-shaped electrode 21 extended through the center hole 11a into the cutout portion or recess 12a of the small diameter section 12 to be made into frictional and electrical contact with the leg 9b of the contact member 9. The leg 10b of the contact member 10 which is inserted into the axial slot 13b and partly extended into the cylindrical cavity 13a is made into contact with the outer shell 22 or another electrode 23 of the cell 5. In the first embodiment the cell 5 is in the form of a rod and consists of the organic electrolytes, which is very compact in size yet capable of producing a high output. For instance, the cell 5 may be of the type disclosed in U.S. Pat. No. 3,700,502, in which the anode is made of lithium; the cathode, carbon fluoride; and the electrolyte consists of $\gamma$-butyrolactone having lithium borofluoride dissolved.

The light source 6 used in the present invention is preferably a light emitting diode because it has strong resistance to impact and eliminates the problem of disconnection of a filament of a conventional incandescent lamp and accordingly ensures a semi-permanent service life. However, the light emitting diodes, in general, start to emit light when the voltage applied thereacross exceeds about 1.7V so that a power source capable of supplying a voltage higher than about 2V is required. A conventional mercury or manganese cell has a terminal voltage of the order of about 1.3 to 1.5V so that at least two cells are required to energize a light emitting diode and consequently a fishing float becomes large in size and heavy in weight. On the other hand, when the organic cells of the type described above are used, only one cell is required and accordingly a fishing float may be advantageously compact in size and light in weight. As a result, the fishing float is very sharply responsive to the biting by a fish. In addition to the above organic cell, lithium-chrominum and lithium-manganese dioxide cells may be also used. Cathode, anode and electrolyte are contained in a metal case made of, for example, aluminum.

Next the functions, effects, features and advantages of the first embodiment with the above construction will be described. Firstly, the contact members 9 and 10 are inserted into the axial grooves 14 and 16, respectively, of the core member 11 which in turn is fitted into the tubular insulation member 17 so that the contact members 9 and 10 can be securely held in position in a simple manner.

When the cell 5 is inserted into the cylindrical cavity 13a of the large diameter section 13 of the core member 11 with the pin-shaped electrode 21 inserted through the center hole 11a into the cutout portion or recess 12a, the legs 9b and 10b of the contact members 9 and 10 can be positively made into electrical contact with the pin-shaped electrode 21 and the shell or electrode 23. The cell may be replaced in a very simple manner, and the positive electric interconnection between the cell 5 and the light source 6 may be ensured.

The lead wires 7a and 7b are inserted through the holes 9a and 10a of the contact members 9 and 10 and are made into electrical contact with the outer surfaces of the contact members 9 and 10 because the tubular member 19 is fitted over the small diameter section 12 of the core member 11 with the lead wires 7a and 7b and the contact members 9 and 10 interposed between the tubular pressing member 19 and the small diameter section 12. Therefore, the step for joining the lead wires 7a and 7b to the contact members 9 and 10 by soldering or spot welding may be eliminated.

The annular ridges 18a of the packing member 18 are resiliently pressed against the inner side wall surface of the lower case 3 to provide the water-tight sealing for the cell 5, the lead wires 7a and 7b and the contact members 9 and 10. Therefore, their corrosion problems due to the contact with the sea water may be eliminated.

The core member 11, the tubular insulation member 17, the packing member 18, the tubular pressure member 19 and the cell 5 can be all made in the form of a cylinder or tube so that their fabrication is much facilitated and they may be readily inserted into the elongated fishing float case. Since the fishing float in accord with the present invention can be considerably elongated, very sharp response can be attained to the biting by a fish.

Second Embodiment, FIGS. 4, 5 and 6

The second embodiment shown in FIGS. 4, 5 and 6 is substantially similar in construction to the first embodiment described above except the arrangement for interconnection between the lead wires 7a and 7b and the cell 5 to be described below.

As shown in FIG. 6, the tubular insulation member 17 consists of a large diameter upper section, a small diameter intermediate section 17b and a large diameter lower section, and the tubular packing member 18 with the axially spaced annular ridges 18a is fitted over the small diameter intermediate section 17b as shown in FIG. 4.

The interconnection arrangement consists of an outer tubular contact member 27 made of an electrically conductive material and fitted over a tubular insulation member 25 which in turn is fitted over an inner tubular contact member 26. The inner tubular contact member 26 has projections 28 extended radially outwardly from the outer side wall surface thereof for engagement with the inner wall surface of the tubular insulation member 25, and the lower end of the tubular contact member 26 is terminated into a plurality of equiangularly spaced and axially downwardly extended legs 26a for frictional snap engagement and electrical contact with the pin-shaped electrode 21 of the cell 5. After the outer tubular contact member 27 having fitted over the tubular insulation member 25, both the upper and lower lugs or projections 29 and 30 are bent radially inwardly over the end faces of the tubular insulation member 25 so that the outer tubular contact member 27 may be securely retained in position relative to the tubular insulation member 25. The lower end of the outer tubular contact member is also terminated into a plurality of equiangularly spaced and axially downwardly extended legs 27a for frictional snap engagement and electrical contact with the shell 22 or another electrode 23 of the cell 5.

The lead wires 7a and 7b are joined to axially upwardly extended projections, respectively, of the inner and outer tubular contact members 26 and 27 by any suitable method as shown in FIG. 4.

The interconnection assembly consisting of the tubular insulation member 25 and the inner and outer tubular contact members 26 and 27 is fitted into the large diameter lower section of the insulation member 17 as best shown in FIG. 4 which in turn is fitted into the elongated fishing float case or casing with the annular ridges 18a water-tightly pressed against the inner side wall surface thereof as with the case of the first embodiment, thus providing the water-tight sealing. The pin-shaped electrode 21 and shell 22 of the cell 5 are resiliently snap-fitted into and securely held in position by the legs 26a and 27a, respectively, of the inner and outer tubular contact members 26 and 27 as shown in FIG. 4. The cell 5 may be readily released from the interconnection assembly when it is pulled downwardly.

What is claimed is:

1. An electric fishing float characterized by the provision of
   a. an elongated tubular fishing float case consisting of an upper case section with a light source positioned therein adjacent a closed top end thereof and a lower case section water-tightly connected to said upper case section,
   b. a cell disposed within said lower case section and having an electrode axially upwardly extended from the top thereof, the shell of said cell serving as another or opposite electrode,
   c. a tubular insulating member having the upper portion thereof water-tightly fitted into the lower portion of the hole of said upper case section,
   d. a pair of contact members securely held in position between said tubular insulating member and a core member inserted into said tubular insulating member, said core member comprising a large diameter cylindrical base section with a cylindrical cavity having an open lower end, said cell being disposed in said cylindrical cavity, and an elongated small diameter cylindrical section axially upwardly extended from said large diameter cylindrical base section coaxially thereof, said tubular insulating member being fitted over said elongated small diameter cylindrical section with said pair of contact members interposed therebetween.
   e. electrical connection means disposed within said core member for making electrical connection between one of said pair of contact members and said axially upwardly extended electrode of said cell and between the other contact member and the shell or opposite electrode of said cell, and
   f. a pair of lead wires for electrically connecting between said light source and said pair of contact members.

2. An electric fishing float as set forth in claim 1 wherein said elongated small diameter cylindrical section of said core member is formed with a cutout portion or recess into which is fitted the lower portion of one of said pair of contact members and which is communicated with said cylindrical cavity of said large diameter cylindrical base section, and said large diameter cylindrical base section is formed with an axially partly extended slot in the side wall thereof through which slot the lower portion of the other contact member is extended into said cylindrical cavity of said large diameter cylindrical base section, whereby when said cell is inserted into said cylindrical cavity of said large diameter cylindrical section, said axially upwardly extended electrode of said cell is made into electrical and resilient frictional engagement with the lower portion of one contact member in said recess while the shell of said cell is made into electrical and resilient frictional engagement with the lower portion of the other contact member extended through said axial slot.

3. An electric fishing float as set forth in claim 2 wherein the lower end of each of said pair of contact members is terminated into a resilient, radially inwardly bulged leg for snap-fitting and electrical engagement with each of the electrodes of said call.

4. An electric fishing float as set forth in claim 1 wherein a tubular insulating pressure member is fitted over the upper portion of said elongated small diameter cylindrical section of said core member with said pair of lead wires and said pair of contact members interposed between said pressure member and said elongated small diameter cylindrical section of said core member in such a way that each of said pair of contact members and each of said pair of lead wires are overlaid over each other to attain the electrical connection therebetween.

5. An electric fishing float as set forth in claim 4 wherein said elongated small diameter cylindrical section of said core member is formed with a pair of diametrically opposed and axially extended grooves for receiving therein said pair of contact members, respectively.

6. An electric fishing float characterized by the provision of a. an elongated tubular fishing float case consisting of an upper case section with a light source positioned therein adjacent a closed top end thereof and a lower case section water-tightly connected to said upper case section, b. a cell disposed within said lower case section and having an electrode axially upwardly extended from the top thereof, the shell of said cell serving as another or opposite electrode, c. a tubular insulating member having the upper portion thereof water-tightly fitted into the lower portion of the hole of said upper case section, d. a pair of contact members securely held in position between said tubular insulating member and a core member inserted into said tubular insulating member, said pair of contact members being in the form of a tube, one of said tubular contact members being disposed over a second tubular insulating member while the other tubular contact member is disposed within said second tubular insulating member, e. electrical connection means disposed within said core member for making electrical connection between one of said pair of contact members and said axially upwardly extended electrode of said cell and between the other contact member and the shell or opposite electrode of said cell, and f. a pair of lead wires for electrically connecting between said light source and said pair of contact members.

* * * * *

UNITED STATES PATENT OFFICE
CERTIFICATE OF CORRECTION

Patent No. 4,070,784         Dated January 31, 1978

Inventor(s) Seiji Yokogawa et al.

It is certified that error appears in the above-identified patent and that said Letters Patent are hereby corrected as shown below:

On the Title Page item 75, should read

-- [75] Inventors: Kiyoshi Takenaka and
Seiji Yokogawa, both of Osaka-fu, Japan --.

Signed and Sealed this

Eighth Day of August 1978

[SEAL]

Attest:

RUTH C. MASON
Attesting Officer

DONALD W. BANNER
Commissioner of Patents and Trademarks